(12) United States Patent
Kaino et al.

(10) Patent No.: US 10,768,504 B2
(45) Date of Patent: Sep. 8, 2020

(54) FIBER ASSEMBLY, DISPLAY UNIT, AND ELECTRONIC APPARATUS

(71) Applicant: Sony Corporation, Tokyo (JP)

(72) Inventors: Yuriko Kaino, Kanagawa (JP); Aya Shuto, Kanagawa (JP)

(73) Assignee: Sony Corporation, Tokyo (JP)

(*) Notice: Subject to any disclaimer, the term of this patent is extended or adjusted under 35 U.S.C. 154(b) by 125 days.

(21) Appl. No.: 16/094,966

(22) PCT Filed: Mar. 9, 2017

(86) PCT No.: PCT/JP2017/009368
§ 371 (c)(1),
(2) Date: Oct. 19, 2018

(87) PCT Pub. No.: WO2017/187808
PCT Pub. Date: Nov. 2, 2017

(65) Prior Publication Data
US 2019/0146299 A1    May 16, 2019

(30) Foreign Application Priority Data

Apr. 27, 2016  (JP) .................................. 2016-089057

(51) Int. Cl.
| | | |
|---|---|---|
| *G02B 26/00* | (2006.01) | |
| *G02F 1/03* | (2006.01) | |
| *G02F 1/133* | (2006.01) | |
| *G09G 3/34* | (2006.01) | |
| *G03G 13/00* | (2006.01) | |
| *G02F 1/1677* | (2019.01) | |

(Continued)

(52) U.S. Cl.
CPC ........... *G02F 1/1677* (2019.01); *B41M 5/323* (2013.01); *B41M 5/46* (2013.01); *D01F 8/00* (2013.01); *D04H 1/413* (2013.01); *D04H 1/4382* (2013.01); *D04H 1/728* (2013.01); *G02F 1/167* (2013.01); *D10B 2401/20* (2013.01); *G02F 2201/02* (2013.01)

(58) Field of Classification Search
CPC .... G02F 1/167; G02F 2001/1678; G02F 1/03; G02F 1/133; G02F 1/061; G02B 26/26; G02B 26/00; G02B 26/08
USPC ........ 359/296, 253–254, 245, 290–291, 298; 349/33; 345/49, 105, 107; 430/31, 32
See application file for complete search history.

(56) References Cited

U.S. PATENT DOCUMENTS

| | | |
|---|---|---|
| 5,153,066 A | 10/1992 | Tanaka et al. |
| 2013/0141512 A1 | 6/2013 | Asai et al. |

FOREIGN PATENT DOCUMENTS

| | | |
|---|---|---|
| EP | 0 410 415 A2 | 1/1991 |
| EP | 2 602 118 A1 | 6/2013 |

(Continued)

OTHER PUBLICATIONS

International Search Report and Written Opinion dated May 30, 2017 in connection with International Application No. PCT/JP2017/009368, and English translation thereof.

(Continued)

*Primary Examiner* — Dawayne Pinkney
(74) *Attorney, Agent, or Firm* — Wolf, Greenfield & Sacks, P.C.

(57) ABSTRACT

A fiber assembly according to one embodiment of the present disclosure includes a fiber. The fiber includes a core part that contains a coloring compound, a photothermal conversion material, and a color developer/reducer, and a sheath part that covers the core part and has a heat-insulating property.

3 Claims, 11 Drawing Sheets

(51) Int. Cl.

| | | |
|---|---|---|
| *B41M 5/46* | (2006.01) | |
| *D04H 1/4382* | (2012.01) | |
| *D04H 1/728* | (2012.01) | |
| *G02F 1/167* | (2019.01) | |
| *D01F 8/00* | (2006.01) | |
| *D04H 1/413* | (2012.01) | |
| *B41M 5/323* | (2006.01) | |

(56) References Cited

FOREIGN PATENT DOCUMENTS

| | | |
|---|---|---|
| EP | 2 921 314 A2 | 9/2015 |
| JP | H03-227402 A | 10/1991 |
| JP | 2004-168024 A | 6/2004 |
| JP | 2006-233351 A | 9/2006 |
| JP | 2013-116599 A | 6/2013 |
| JP | 2015-193232 | 11/2015 |

OTHER PUBLICATIONS

International Preliminary Report on Patentability dated Nov. 8, 2018 in connection with International Application No. PCT/JP2017/009368, and English translation thereof.

[FIG. 1]
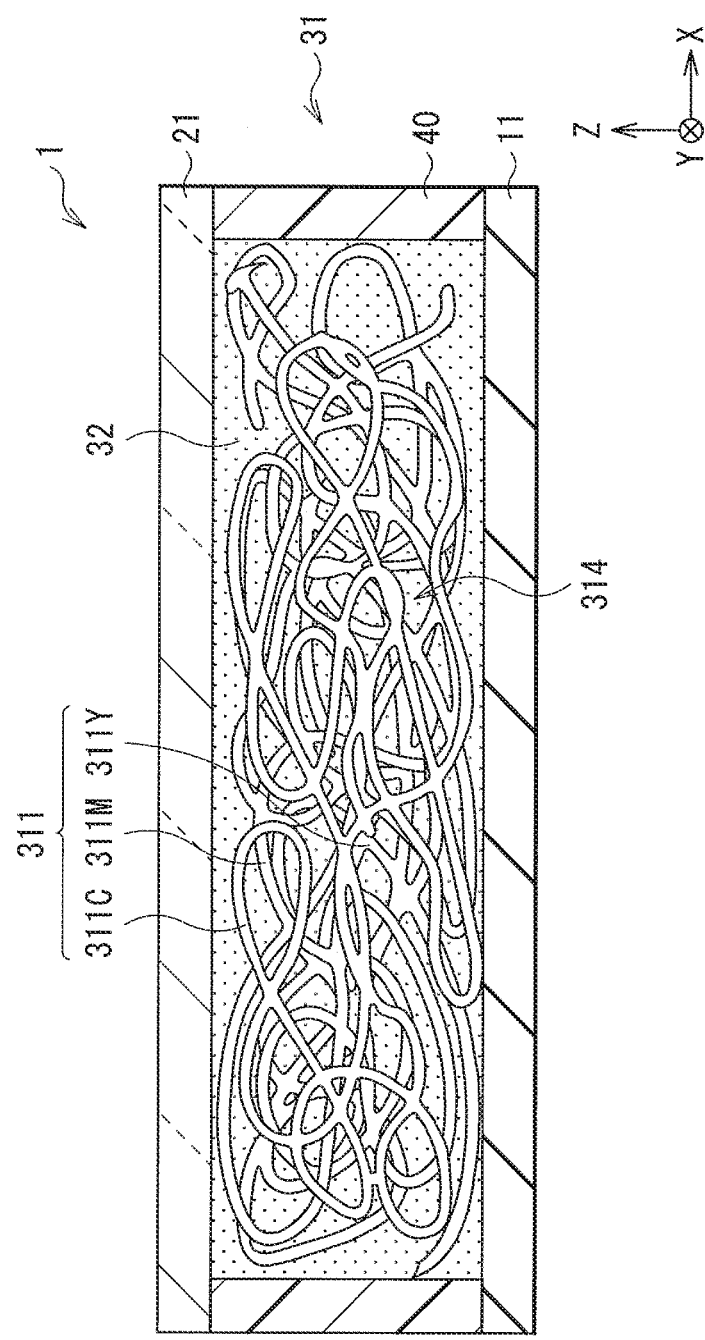

[ FIG. 2 ]
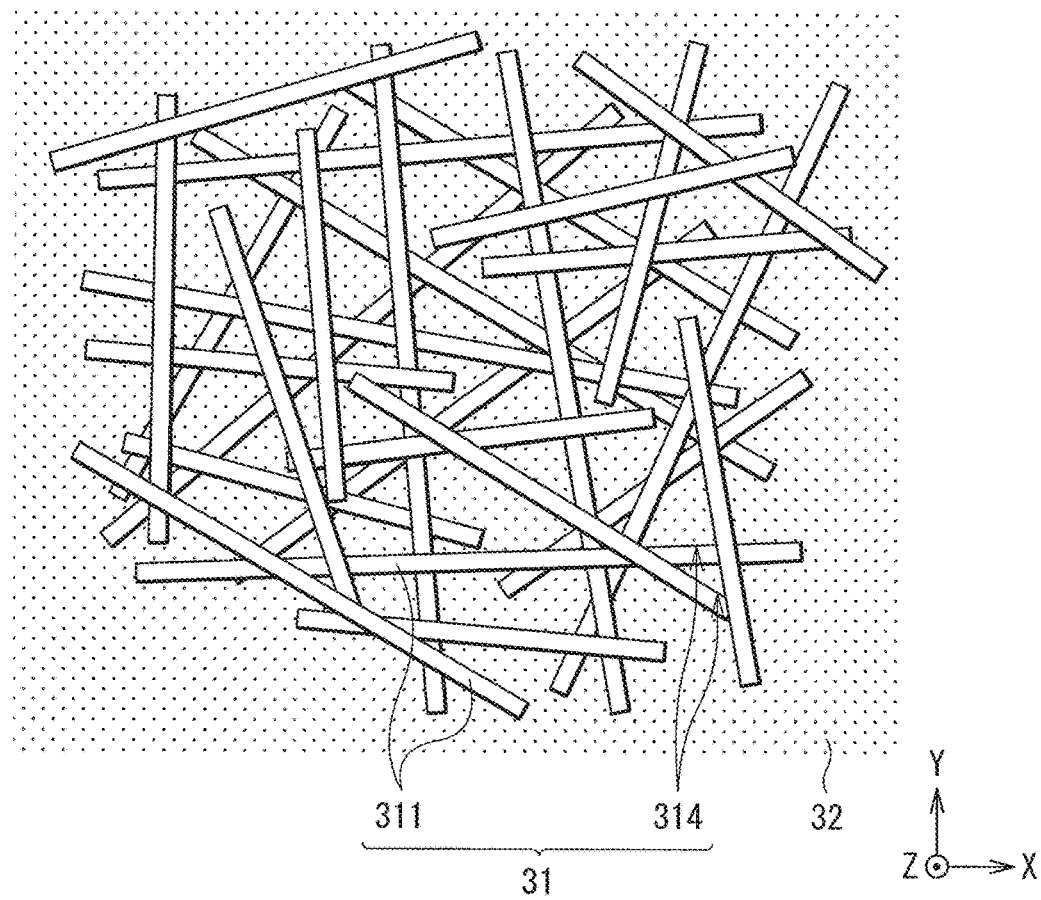
[ FIG. 3 ]
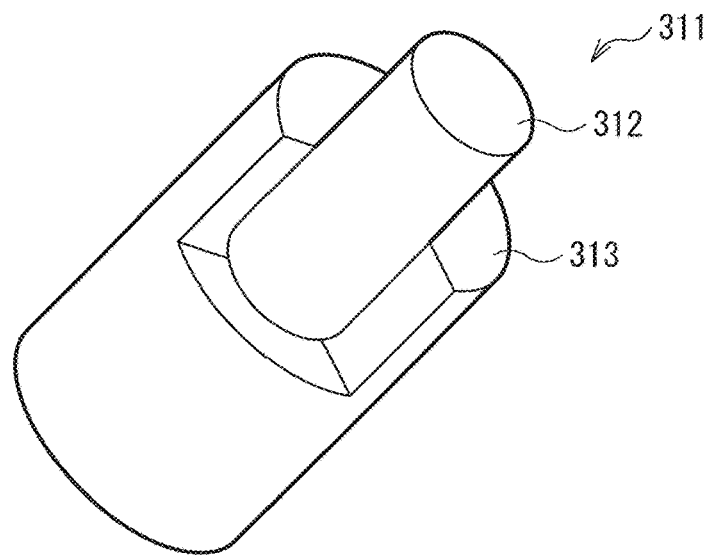

[ FIG. 4 ]
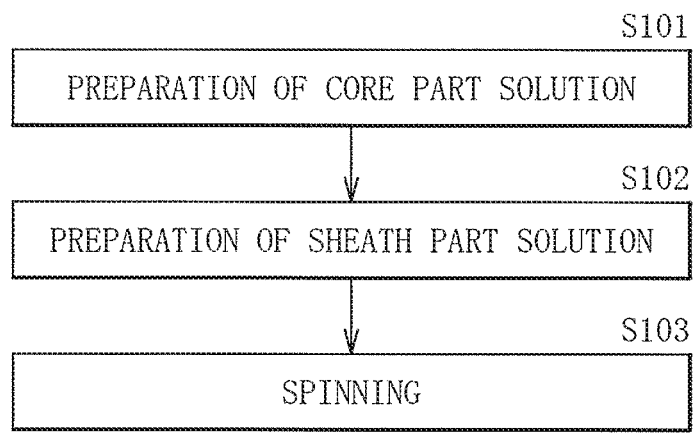
[ FIG. 5 ]
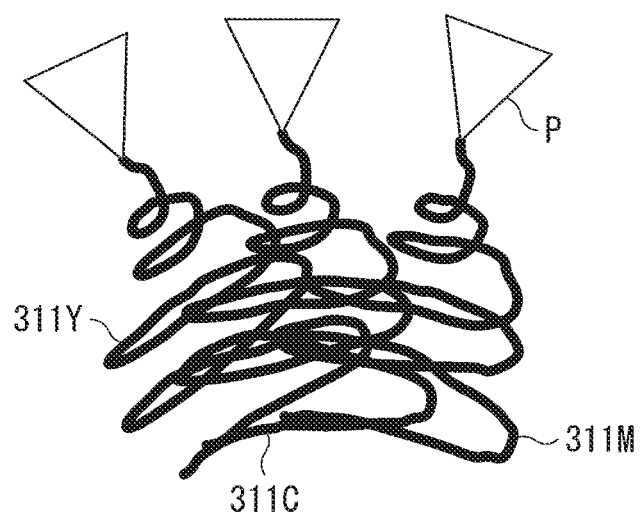

[ FIG. 6 ]
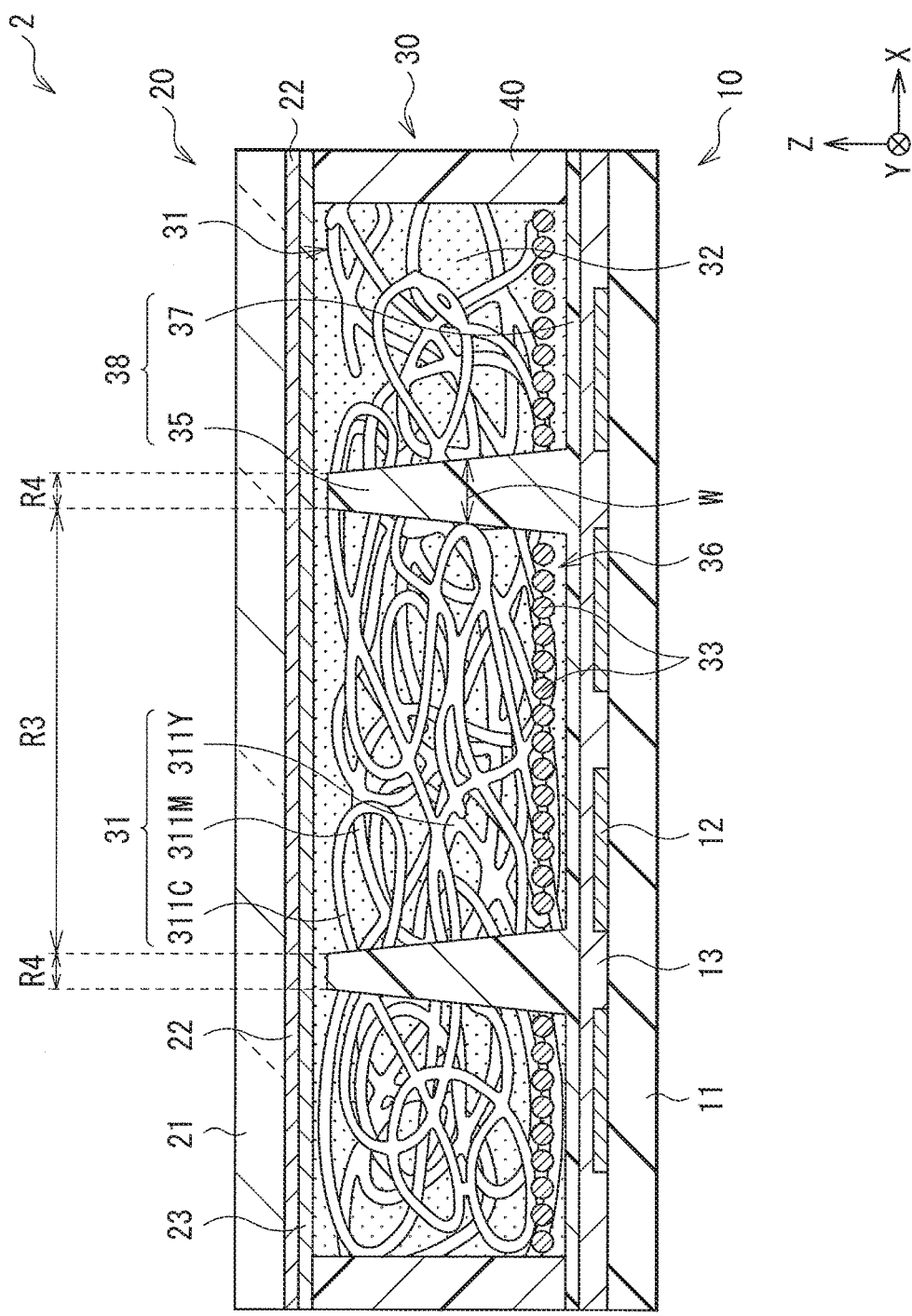

[ FIG. 7 ]
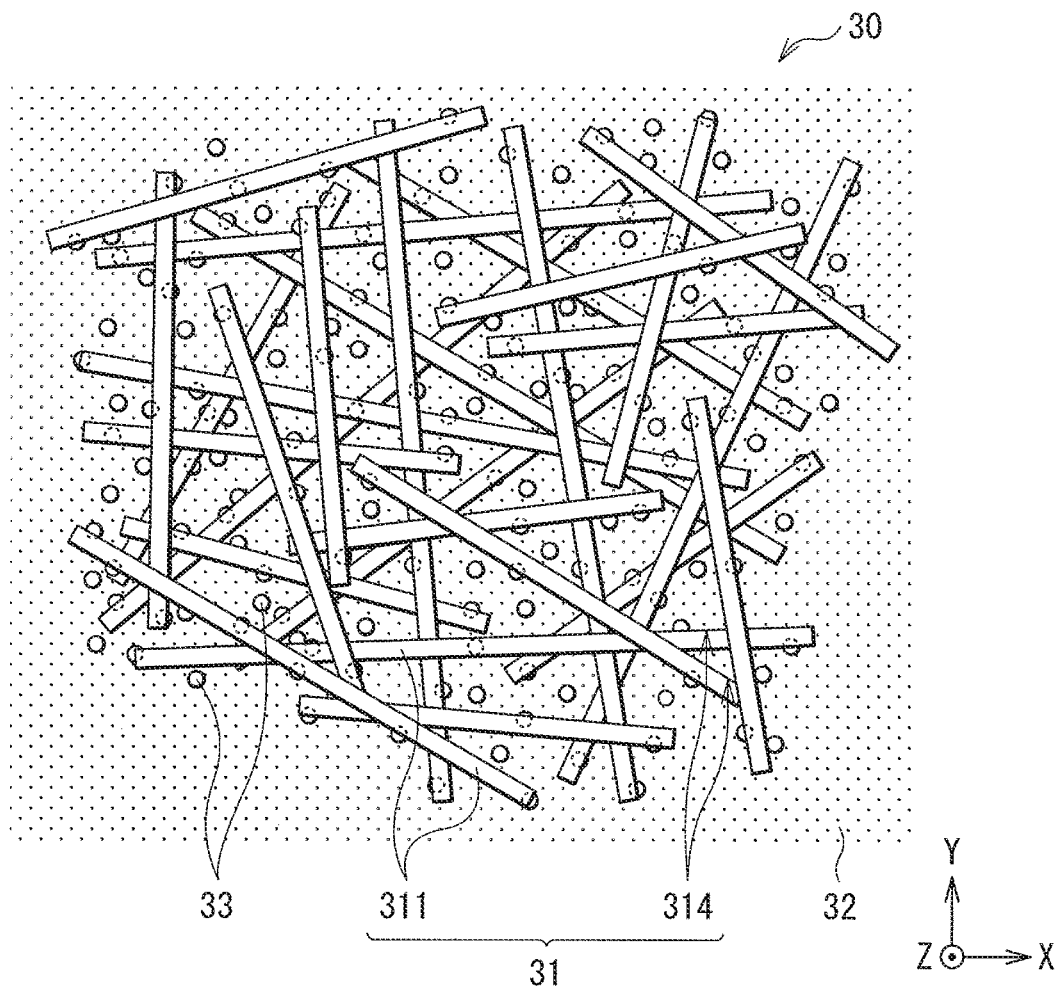

[ FIG. 9A ]
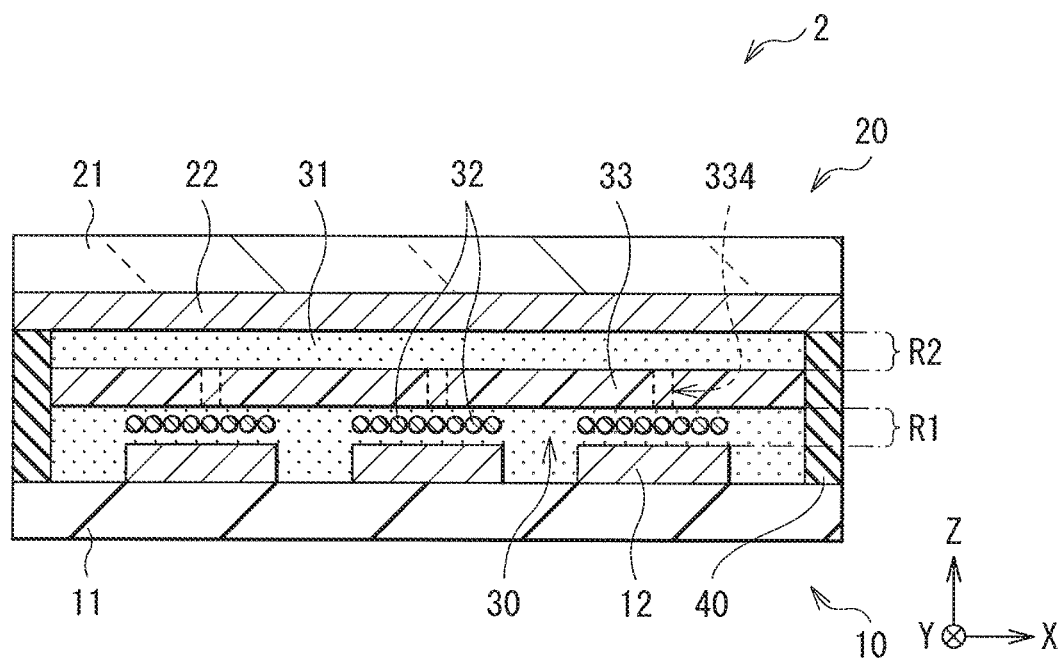
[ FIG. 9B ]
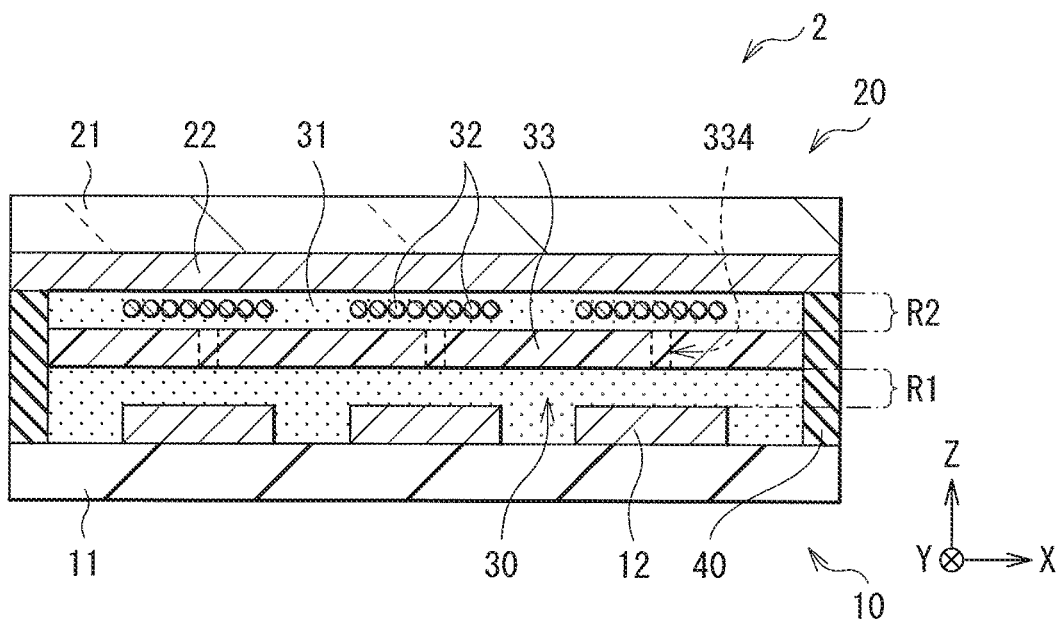

[ FIG. 10A ]
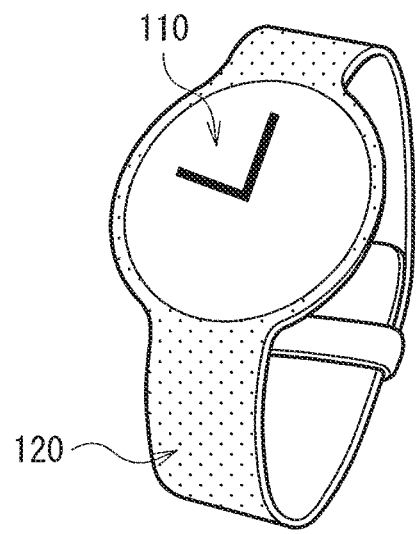
[ FIG. 10B ]
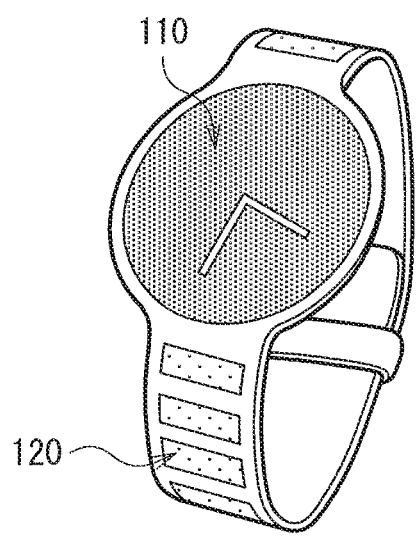

[ FIG. 11A ]
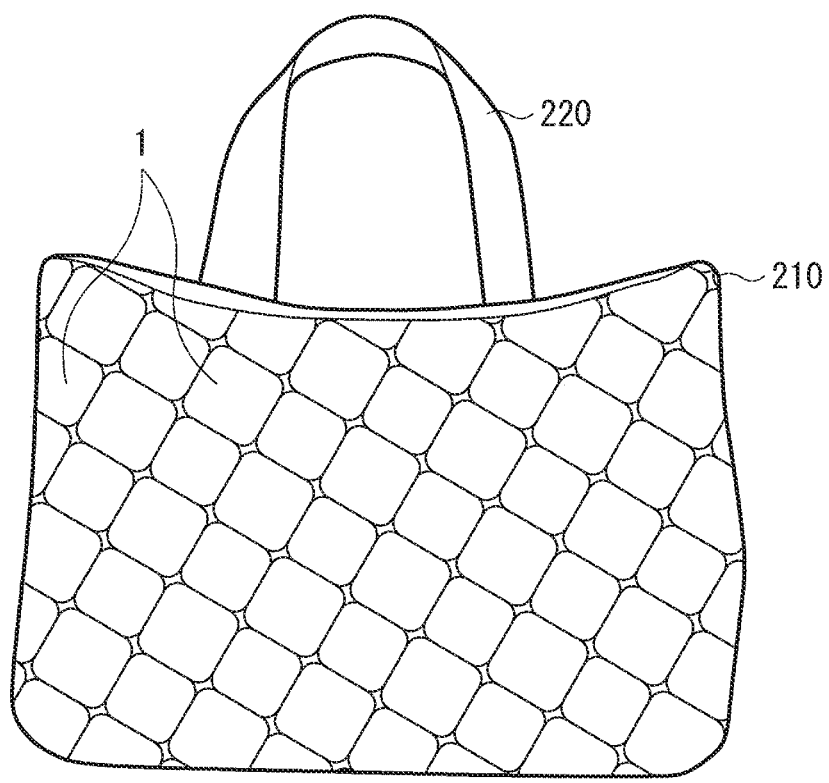
[ FIG. 11B ]
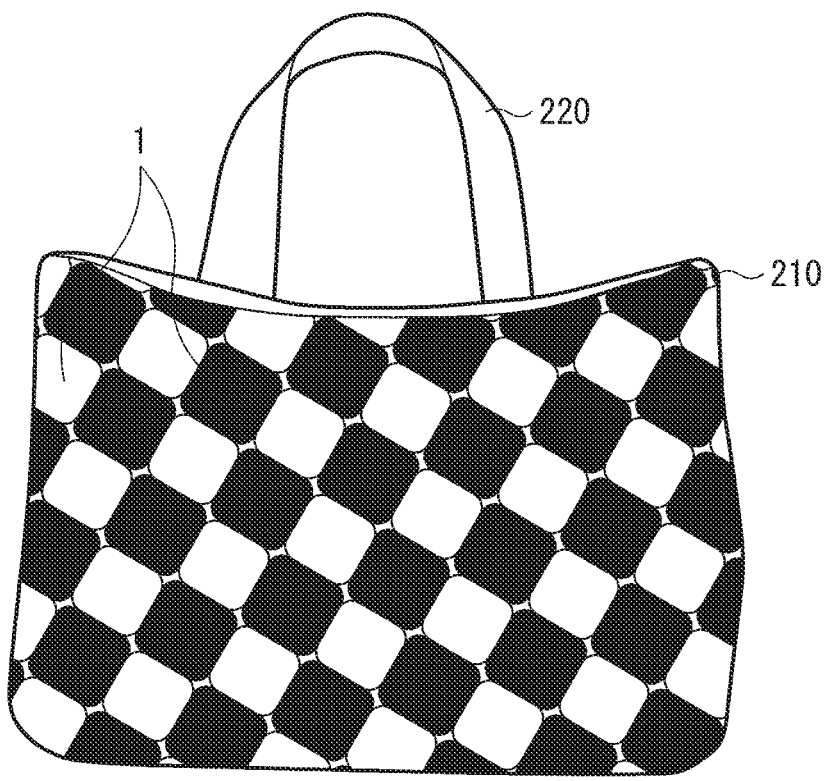

[FIG. 12A]
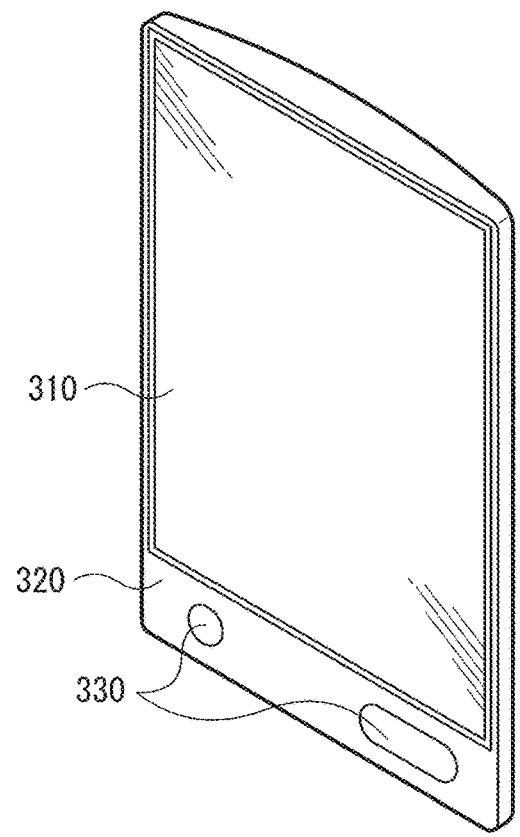
[FIG. 12B]
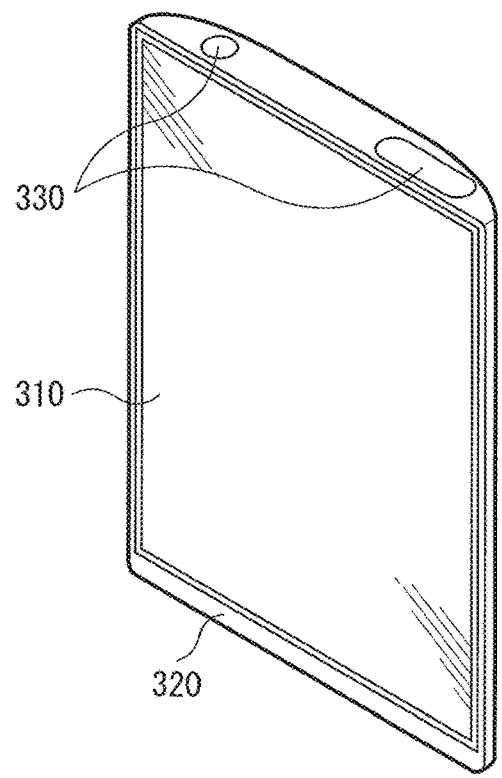

[ FIG. 13 ]
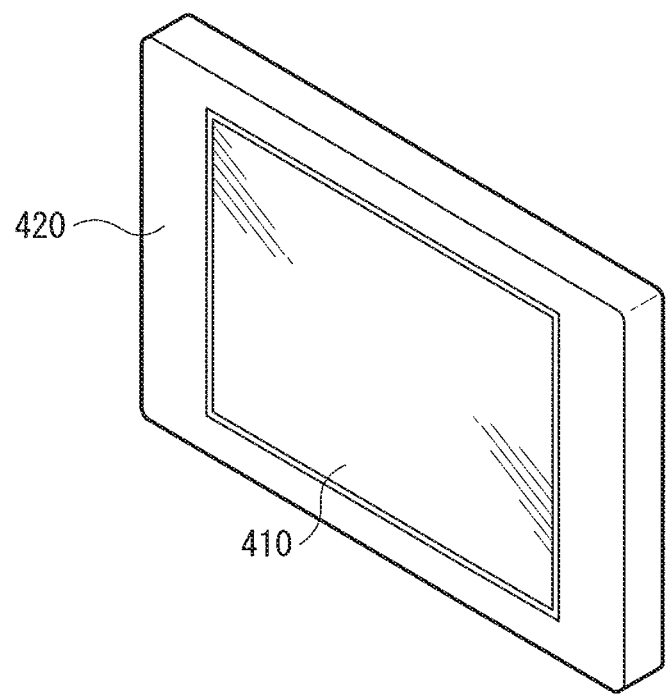

FIBER ASSEMBLY, DISPLAY UNIT, AND ELECTRONIC APPARATUS

CROSS REFERENCE TO RELATED APPLICATIONS

This is a U.S. National Stage Application under 35 U.S.C. § 371, based on International Application No. PCT/JP2017/009368, filed Mar. 9, 2020, which claims priority to Japanese Patent Application JP 2016-089057, filed Apr. 27, 2016, each of which is hereby incorporated by reference in its entirety.

TECHNICAL FIELD

The present disclosure relates to a fiber assembly that includes a fiber containing, for example, a leuco dye as a coloring compound, a display unit that includes the fiber assembly, and an electronic apparatus that includes the fiber assembly.

BACKGROUND ART

As a display medium that allows for reversible recording and erasing of information by means of heat, there is disclosed, for example, a reversible multicolor recording medium in which a plurality of recording layers that reversibly produce color in different tones are formed in isolation and in a stack (for example, see PTL 1). The plurality of recording layers each include: a photothermal conversion material that absorbs infrared light in a specific wavelength region and generates heat; a coloring compound having an electron-donating property; and a color developer/reducer having an electron-accepting property. In a case where this reversible multicolor recording medium is irradiated with infrared light in a specific wavelength region, only a recording layer containing a corresponding photothermal conversion material makes a reversible change in color, i.e., produces color or decolors. Furthermore, a heat-insulating layer is provided between the plurality of recording layers to avoid interlayer heat conduction.

CITATION LIST

Patent Literature

PTL 1: Japanese Unexamined Patent Application Publication No. 2004-168024

SUMMARY OF THE INVENTION

Incidentally, it is desired that a display medium, that allows for reversible recording and erasing of information by means of heat to have higher display performance.

It is desirable to provide a fiber assembly, a display unit, and an electronic apparatus that are able to improve display performance.

A fiber assembly according to an embodiment of the present disclosure includes a fiber. The fiber includes: a core part that contains a coloring compound, a photothermal conversion material, and a color developer/reducer; and a sheath part that covers the core part and has a heat-insulating property.

A display unit according to an embodiment of the present disclosure includes a display body between a first substrate and a second substrate that are disposed to face each other. The display body includes a migrating particle and a fiber assembly in an insulating liquid. The fiber assembly is different in optical reflection property from the migrating particle, and is of the foregoing embodiment of the present disclosure.

An electronic apparatus according to an embodiment of the present disclosure includes the display unit of the foregoing embodiment of the present disclosure.

In the fiber assembly of the embodiment, the display unit of the embodiment, and the electronic apparatus of the embodiment of the present disclosure, the fiber having a core-sheath structure is used. The core part included in the fiber contains the coloring compound, the photothermal conversion material, and the color developer/reducer, and the sheath part has the heat-insulating property. Accordingly, it is possible to suppress producing of color or decoloring of the fiber in a part other than an intended part (for example, a part irradiated with infrared light).

According to the fiber assembly of the embodiment, the display unit of the embodiment, and the electronic apparatus of the embodiment of the present disclosure, the fiber including the core part which contains the coloring compound, the photothermal conversion material, and the color developer/reducer, and the sheath part which covers the core part and has the heat-insulating property is used. Therefore, producing of color or decoloring of the fiber in a part other than an intended part is suppressed, which makes it possible to improve display performance.

It is to be noted that the effects described above are non-limiting, and any effect described in the present disclosure may be provided.

BRIEF DESCRIPTION OF DRAWINGS

FIG. 1 is a cross-sectional view illustrating an example of a configuration of a reversible recording medium including a fiber assembly according to a first embodiment of the present disclosure.

FIG. 2 is a schematic plan view that describes the fiber assembly illustrated in FIG. 1.

FIG. 3 is a diagram illustrating a structure of fibers included in the fiber assembly illustrated in FIG. 1.

FIG. 4 is a flowchart illustrating an example of a process of manufacturing the fiber assembly illustrated in FIG. 1.

FIG. 5 is a schematic diagram that describes a spinning process illustrated in FIG. 4.

FIG. 6 is a cross-sectional view illustrating an example of a configuration of a display unit according to a second embodiment of the present disclosure.

FIG. 7 is a schematic plan view that describes an electrophoresis device illustrated in FIG. 6.

FIG. 9A is a cross-sectional view that describes an operation of the display unit illustrated in FIG. 6.

FIG. 9B is a cross-sectional view that describes the operation of the display unit illustrated in FIG. 6.

FIG. 10A is a perspective view illustrating an example of an exterior of Application example 1.

FIG. 10B is a perspective view illustrating another example of the exterior of Application example 1.

FIG. 11A is a perspective view illustrating an example of an exterior of Application example 2.

FIG. 11B is a perspective view illustrating another example of the exterior of Application example 2.

FIG. 12A is a perspective view illustrating an example of an exterior of Application example 3.

FIG. 12B is a perspective view illustrating another example of the exterior of Application example 3.

FIG. 13 is a perspective view illustrating an exterior of Application example 4.

MODES FOR CARRYING OUT THE INVENTION

Figure 8:
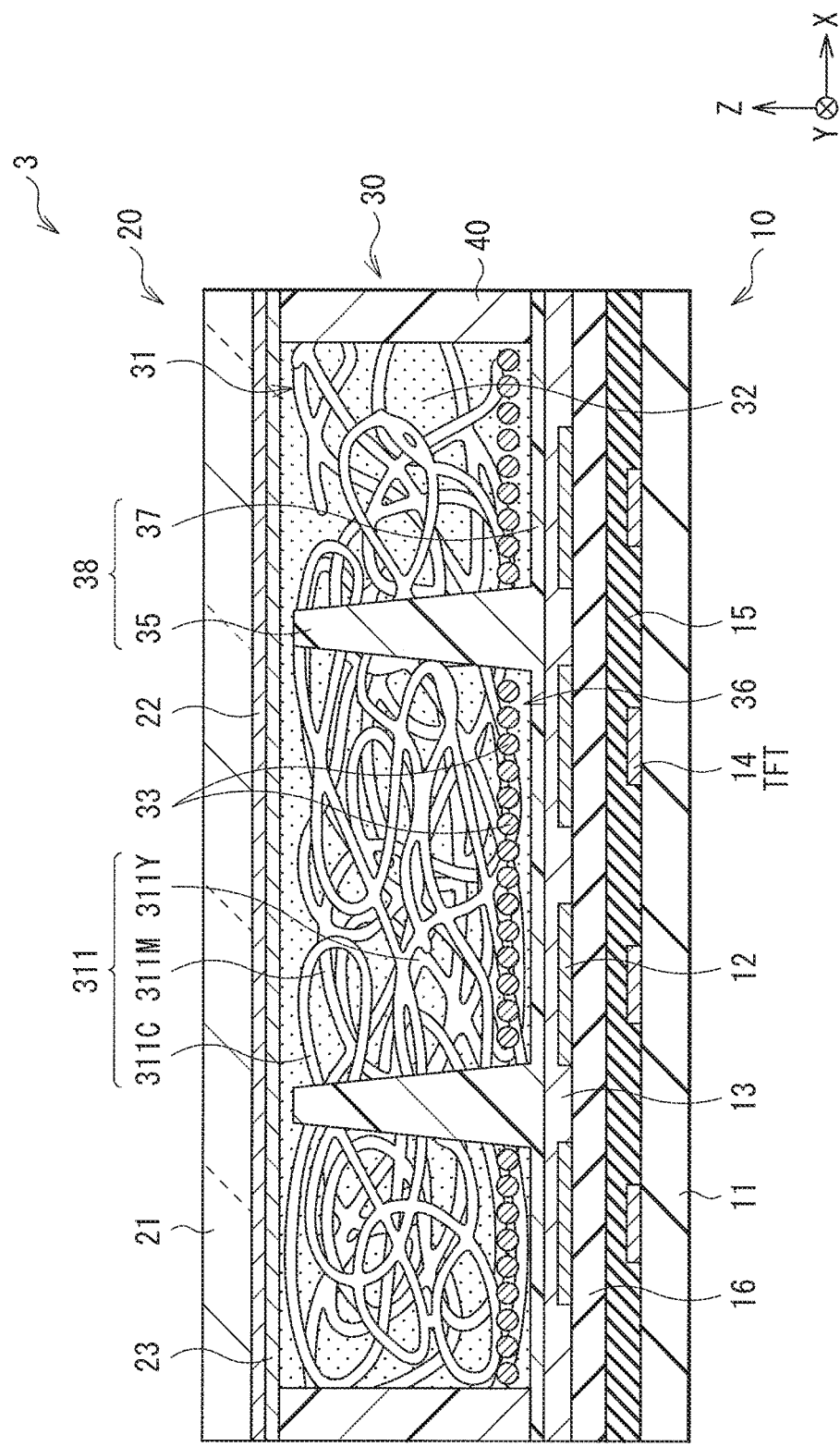
FIG. 8 is a cross-sectional view illustrating another example of the configuration of the display unit according to the second embodiment of the present disclosure.

In the following, embodiments of the present disclosure are described in detail with reference to drawings. It is to be noted that description is made in the following order.
1. First Embodiment (A reversible recording medium including a fiber assembly having a core-sheath structure)
    1-1. Configuration of Reversible Recording Medium
    1-2. Manufacturing Method of Fiber Assembly
    1-3. Recording and Erasing Method of Reversible Recording Medium
    1-4. Workings and Effects
2. Second Embodiment (A display unit including a fiber assembly having a core-sheath structure)
    2-1. Configuration of Display Unit
    2-2. Manufacturing Method of Display Unit
    2-3. Operation of Display Unit
    2-4. Workings and Effects
3. Application Examples
4. Working Examples 1. First Embodiment FIG. 1 illustrates a cross-sectional configuration of a reversible recording medium (a reversible recording medium 1) according to a first embodiment of the present disclosure. The reversible recording medium 1 includes, as a display medium that allows for reversible recording and erasing of information by means of heat, a fiber assembly (a fiber assembly 31) disposed, for example, between a pair of support bases 11 and 21. The pair of support bases 11 and 21 are disposed to face each other. FIG. 2 schematically illustrates a planar configuration of the fiber assembly 31. It is to be noted that FIG. 1 schematically illustrates the configuration of the reversible recording medium 1, and may have dimensions and shapes different from the actual dimensions and shapes.

[1-1. Configuration of Reversible Recording Medium]

The support base 11 includes, for example, an inorganic material, a metallic material, a plastic material, etc. Examples of such an inorganic material include silicon (Si), silicon oxide (SiO$_x$), silicon nitride (SiN$_x$), aluminum oxide (AlO$_x$), etc. Silicon oxide includes glass, spin-on glass (SOG), etc. Examples of such a metallic material include aluminum (Al), nickel (Ni), stainless steel, etc. Examples of such a plastic material include polycarbonate (PC), polyethylene terephthalate (PET), polyethylene naphthalate (PEN), polyetheretherketone (PEEK), etc.

This support base 11 may be light transmissive, or may be light non-transmissive. A reason for this is that an image is displayed on the support base 21 side, and therefore, the support base 11 does not necessarily have to be transmissive to light. The support base 11 may be a substrate having stiffness, such as a wafer, or may include thin-film glass, a film, etc. having flexibility. By using a flexible material for the support base 11, it becomes possible to achieve a flexible (bendable) reversible recording medium. It is to be noted that a reflecting layer (not illustrated) is preferably provided on a top surface or an undersurface of the support base 11. By providing the reflecting layer, color display is able to be more vivid.

The support base 21 includes a material similar to that of the support base 11, except that it is transmissive to light.

The fiber assembly 31 reversibly colors (produces color) or decolors by means of heat, and makes reversible recording and erasing of information possible. The fiber assembly 31 is, for example, a fabric-like three-dimensional structure formed by aggregating and randomly piling up fibrous substances (fibers 311) having a sufficient length with respect to a fiber diameter (a diameter). The fabric here is an assembly of a plurality of fibers made through a process of interlacing of the fibers, such as weaving or forming them into a thin sheet, one formed through a process of interlacing and knitting of one or a plurality of fibers, or non-woven fabric formed by entangling one fiber. Non-woven fabric is preferable because it is not necessary to perform a fiber assembly forming step, such as knitting, weaving, and forming fibers into a thin sheet. As described above, the fiber assembly 31 is formed by randomly piling up the fibers 311, and, for example, a void (fine pores 314) is provided between the fibers as illustrated in FIG. 1, FIG. 2, etc.

The fiber 311 may be linear as illustrated in FIG. 2, or may be curled or bent at some middle part. Furthermore, the fiber 311 is not limited to extend in one direction, and may be branched in one, or two or more directions at some middle part. The fiber 311 included in the fiber assembly 31 in the present embodiment has a so-called core-sheath structure including a core part 312 and a sheath part 313 that covers the core part 312 as illustrated in FIG. 3. The core part 312 contains a coloring compound, a photothermal conversion material, and a color developer/reducer.

The core part 312 includes, for example, a polymeric material including the coloring compound, the photothermal conversion material, and the color developer/reducer as described above. The polymeric material is preferably the one that allows the coloring compound, the photothermal conversion material, and the color developer/reducer to be easily dispersed evenly. Specific examples of such a polymeric material include polyvinyl chloride, polyvinyl acetate, vinyl chloride-vinyl acetate copolymer, ethyl cellulose, polystyrene, styrene-based polymer, phenoxy resin, polyester, aromatic polyester, polyurethane, polycarbonate, polyacrylic acid ester, polymethacrylate ester, acrylate-based polymer, maleic-acid-based polymer, polyvinyl alcohol, modified polyvinyl alcohol, hydroxyethyl cellulose, carboxymethyl cellulose, starch, etc.

Examples of the coloring compound include a leuco dye. Examples of the leuco dye include an existing dye for heat-sensitive paper. One specific example thereof is a compound represented by the following formula (1) that includes, for example, a group having an electron-donating property in a molecule.

[Chem. 1]

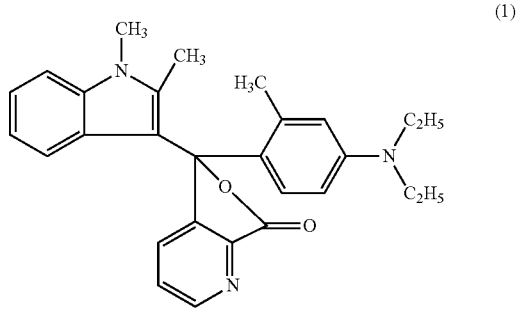

(1)

The color developer/reducer is, for example, for producing a color of a colorless coloring or decoloring the coloring compound exhibiting any color. As such a color developer/reducer a phenol derivative, a salicylic acid derivative, a urea derivative, etc. are referred to. Specifically, for example, a compound represented by the following general formula (2) that includes, for example, a group having an electron-accepting property in a molecule is referred to.

[Chem. 2]

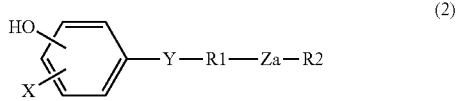

(2)

(X is any of H, OH, COOH, and halogen. Y is any of —NHCO—, —CONH—, —NHCONH—, —CONHCO—, —NHNHCO—, —CONHNH—, —CONHNHCO—, —NHCOCONH—, —NHCONHCO—, —CONHCONH—, —NHNHCONH—, —NHCONHNH—, —CONHNHCONH—, —NHCONHNHCO—, and —CONHNHCONH—. R1 and R2 are each independently a hydrocarbon group having carbon number from 2 to 26, and the sum of the carbon numbers of R1 and R2 is equal to or greater than 9 and equal to or smaller than 30. Z is any of —COO—, —OCO—, —O—, —CONH—, —NHCO—, —NHCONH—, —NHNHCO—, —CONHNH—, —CH($C_nH_{2n}OH$)— (n=0 to 5). "a" is 0 or 1.)

For example, a compound represented by the following formula (3) is a specific example of the color developer/reducer represented by the above general formula (2).

[Chem. 3]

(3)

The photothermal conversion material absorbs light in a specific wavelength region and generates heat. Examples of such a photothermal conversion material include a phthalocyanine-based dye, a cyanine-based dye, a metal complex dye, a diimonium-based dye, etc. that are commonly used as an infrared-light absorbing dye having little absorption in a visible region.

The core part 312 may contain various addition agents, such as a sensitizer and an ultraviolet-light absorber, besides the coloring compound, the photothermal conversion material, and the color developer/reducer. The sensitizer lowers a decoloring temperature to improve decoloring sensitivity or lowers a color-development temperature to improve recording sensitivity, and makes it possible to achieve the producing of color and decoloring at lower energy.

The sheath part 313 has a heat-insulating property, and is for covering the core part 312, thereby trapping heat converted by the photothermal conversion material inside the fiber 311 and preventing heat conduction to adjacent fibers. The sheath part 313 includes a material having a heat-insulating property (a heat-insulating material). The heat-insulating material is a general polymeric material having a light transmission property. Specific examples of the material include polyvinyl chloride, polyvinyl acetate, vinyl chloride-vinyl acetate copolymer, ethyl cellulose, polystyrene, styrene-based polymer, phenoxy resin, polyester, aromatic polyester, polyurethane, polycarbonate, polyacrylic acid ester, polymethacrylate ester, acrylate-based copolymer, maleic-acid-based polymer, polyvinyl alcohol, modified polyvinyl alcohol, hydroxyethyl cellulose, carboxymethyl cellulose, starch, etc. The sheath part 313 may contain various addition agents, such as an ultraviolet-light absorber.

A maximum fiber diameter of the fiber 311 included in the fiber assembly 31 is, for example, preferably 100 μm or less, and more preferably 50 μm or less. Of this, a fiber diameter of the core part 312 is preferably, for example, equal to or greater than 50 nm and equal to or smaller than 30 μm. A thickness of the sheath part 313 is preferably, for example, equal to or greater than 50 nm and equal to or smaller than 50 am. An average fiber diameter of the fibers 311 included in the fiber assembly 31 is preferably, for example, equal to or greater than 0.1 μm and equal to or smaller than 10 am; however, it may be out of the above range. It is to be noted that the average fiber diameter is able to be measured by microscope observation using, for example, a scanning electron microscope, etc. The fiber assembly 31 has any average length.

The fiber 311 is preferably a nanofiber. The nanofiber here is a fibrous substance having a fiber diameter of 0.001 μm to 1 μm and a length of 100 times or more of the fiber diameter. By forming the fiber assembly 31 using such a nanofiber, light is caused to be irregularly reflected more easily, and a reflectivity of the fiber assembly 31 is improved. Furthermore, the fiber assembly 31 including a nanofiber has a larger specific surface area because of fineness of the fiber 311, and therefore its heat radiation performance is improved. Moreover, in the fiber assembly 31 including a nanofiber, the ratio of the fine pores 314 to a unit volume is increased, and the heat radiation performance and inter-fiber heat-insulating efficiency are improved.

The fiber assembly 31 may include multiple types of fibers 311 that exhibit colors different from each other. Specifically, the multicolor display fiber assembly 31 is able to be formed by combining multiple types of fibers that contain coloring compounds which exhibit colors different from each other, color developers/reducers corresponding to the respective coloring compounds, and photothermal conversion materials which absorb light in wavelength regions different from each other and generate heat. For example, as illustrated in FIG. 1, a fiber assembly 331 is formed by using: a fiber 311C including a coloring compound that produces cyan color, and a color developer/reducer corresponding to this coloring compound, and a photothermal conversion material which absorbs, for example, infrared light having a wavelength $\lambda_1$ and exhibits; a fiber 311M including a coloring compound that produces magenta color, and a color developer/reducer corresponding to this coloring compound, and a photothermal conversion material which absorbs, for example, infrared light having a wavelength $\lambda_2$ and generates heat; and a fiber 311Y including a coloring compound that produces yellow color, and a color developer/reducer corresponding to this coloring compound, and a photothermal conversion material which absorbs, for example, infrared light having a wavelength $\lambda 3$ and generates heat. Thereby, a display medium that is able to perform a full-color display is obtained. It is to be noted that, in a case of forming the fiber assembly 31 that is able to perform the multicolor display (or full-color display), a combination of materials that have narrow photoabsorption bands not overlapping with each other is preferably selected as photothermal conversion materials. This makes it possible to selectively cause an intended fiber (for example, any of the fibers 311C, 311M, and 311Y) to produce color or decolor.

The fiber assembly 31 is able to be formed by using, for example, a melt spinning method, a dry spinning method, a wet spinning method, or an electrospinning method. Of these, the wet spinning method or the electrospinning method is preferable. These two spinning methods include a process of dissolving a component intended to be formed into fibers in a solvent and removing the solvent at the time of spinning or after spinning. Accordingly, the component intended to be contained in fibers is able to be concentrated when the solvent is removed and have high concentration. By using particularly the electrospinning method, it becomes possible to form the fiber 311 with the small fiber diameter easily and stably. Furthermore, in a case of forming the fiber assembly 31 that are able to exhibit multiple colors as described above, it is possible to form a plurality of fibers that exhibit different colors at the same time. By forming the fiber assembly 31 using the electrospinning method in this way, it becomes possible to simplify a manufacturing process.

Although it is not particularly limited, an average pore diameter of the fine pores 314 is preferably as large as possible, and is preferably equal to or greater than 0.1 µm and equal to or smaller than 10 µm. By enlarging the pore diameter of the fine pores 314, it becomes possible to improve the inter-fiber heat radiation property and the inter-fiber heat-insulating efficiency and prevent producing of color or decoloring of anywhere but a specific part. In particular, in the fiber assembly 31 including a plurality of fibers (the fibers 311C, 311M, and 311Y) that exhibit colors different from one another, it is possible to suppress producing of color or decoloring of fibers (the fibers 311M and 311Y) other than a fiber (for example, the fiber 311C) that exhibits an intended color as a result of heat conduction.

A space between the support base 11 and the support base 21 is supported and sealed by, for example, a spacer 40. The spacer 40 includes, for example, an insulating material such as a polymeric material. The space between the support base 11 and the support base 21 sealed by the spacer 40 is filled with, for example, gas (for example, air), liquid (for example, an insulating liquid 32), solid, or a mixture of these, and the fine pores 314 provided in the fiber assembly 31 are filled with any of the above. It is to be noted that FIGS. 1 and 2 illustrate an example where the fiber assembly 31 is filled with the insulating liquid 32. Details of the insulating liquid 32 are described in a second embodiment.

[1-2. Manufacturing Method of Fiber Assembly]

The fiber assembly 31 in the present embodiment is able to be manufactured, for example, in accordance with a flowchart illustrated in FIG. 4. It is to be noted that the manufacturing method described here is an example, and the fiber assembly 31 may be manufactured by another method.

First, for example, poly-(vinyl chloride-co-vinyl acetate) as the polymeric material is dissolved in a solvent (for example, THF). The color developer/reducer, the coloring compound, and the photothermal conversion material are dispersed in this solvent to prepare a spinning solution for the core part 312 (a solution for core part) (Step S101). Thereafter, while a solvent (for example, pure water) is being stirred, for example, polyvinyl alcohol as the heat-insulating material is added to the solvent. This solution is heated up to, for example, a temperature of 100° C., and is kept, for example, for one hour to prepare a spinning solution for the sheath part 313 (a sheath part solution) (Step S102). The solution for core part and the sheath part solution are put into a syringe for core part and a syringe for sheath part, respectively. An electrospinning apparatus applies a voltage of 40 kV to these syringes and performs spinning in a spinning environment kept, for example, at a temperature of 60° C. to form the solutions into fibers (Step S103). Through this, the fiber assembly 31 having the core-sheath structure is formed.

It is to be noted that, as described above, in a case of forming the fiber assembly 31 including a plurality of fibers (for example, the fibers 311C, 311M, and 311Y) that exhibit colors different from one another, respective core part solutions and respective sheath part solutions are prepared, and are put into different syringes. For example, as illustrated in FIG. 5, the solutions are ejected through respective nozzles P at the same time to form the solutions into fibers. Thus, the fiber assembly 31 that allows for the multicolor display or full-color display is formed. It is to be noted that, in FIG. 5, only the syringes for core part are illustrated for sake of simplicity of contents of the illustration.

[1-3. Recording and Erasing Method of Reversible Recording Medium]

The reversible recording medium 1 in the present embodiment allows for recording and erasing, for example, as follows. It is to be noted that here is described the above-described fiber assembly 31 including the three types of the fibers 311C, 311M, and 311Y that exhibit a cyan color, a magenta color, and a yellow color, respectively, as an example.

First, the fiber assembly 31 is heated at a temperature that allows for decoloring of the respective fibers 311C, 311M, and 311Y, for example, at a temperature of 120° C., and is put into a decolored state in advance. Thereafter, any part of the fiber assembly 31 is irradiated with infrared light having any selected output and any selected wavelength by means of, for example, a semiconductor laser or the like. Here, in a case of causing the fiber 311C to produce color, infrared light having the wavelength $\lambda_1$ is applied at energy to an extent that allows the fiber 311C to reach the color-producing temperature. This causes the photothermal conversion material included in the fiber 311C to generate heat, and the coloring compound and the color developer/reducer cause a coloring reaction (a color-producing reaction). Thus, the irradiated part produces cyan color. Likewise, in a case of causing the fiber 311M to produce color, infrared light having the wavelength $\lambda_2$ is applied at energy to an extent that allows the fiber 311M to reach the color-producing temperature. In a case of causing the fiber 311Y to produce color, infrared light having the wavelength $\lambda_3$ is applied at energy to an extent that allows the fiber 311Y to reach the color-producing temperature. This causes the photothermal conversion materials included in the fibers 311C and 311Y to generate heat, and the coloring compounds and the color developers/reducers cause a coloring reaction. Thus, the respective irradiated parts produce magenta and yellow colors. By irradiating some part with infrared light having a corresponding wavelength in this way, it becomes possible to record information (for example, a full-color image).

On the other hand, in a case of decoloring each of the fibers 311C, 311M, and 311Y caused to produce a color as described above, infrared light having a wavelength corresponding to each of the fibers 311C, 311M, and 311Y is applied at energy to an extent that allows the relevant fiber to reach a decoloring temperature. This causes the photo-thermal conversion material included in each of the fibers 311C, 311M, and 311Y to generate heat, and the coloring compound and the color developer/reducer cause a decoloring reaction. Thus, the produced color of the irradiated part disappears, and the record is erased. Furthermore, in a case of erasing all records formed on the fiber assembly 31 in a batch, by heating the fiber assembly 31 at a temperature that allows for decoloring of all of the fibers 311M, 311M, and 311Y, for example, at 120° C., information recorded on the fiber assembly 31 is erased in a batch. Thereafter, by performing the above-described operation, recording on the fiber assembly 31 is able to be performed repeatedly.

It is to be noted that the color produced state or the decolored state is kept unless the above-described color-producing or decoloring reaction such as the infrared radiation and heat generation is performed.

[1-4. Workings and Effects]

As described above, there is, as a display medium that allows for reversible recording and erasing of information by means of heat, a reversible multicolor recording medium in which layers each including the photothermal conversion material that absorbs infrared light in a specific wavelength region and generates heat, a coloring compound having an electron-donating property, and a color developer/reducer having an electron-accepting property are formed in isolation and in a stack. In this reversible multicolor recording medium, only when it is irradiated with infrared light in the specific wavelength region, only a recording layer containing a corresponding photothermal conversion material makes a reversible change in color, i.e., produces color or decolors.

The reversible multicolor recording medium is expected to have higher display performance, for example, high-resolution display, with a wide color gamut, etc. As to the color gamut, particularly, the reversible multicolor recording medium is expected not only to allow each color component to produce color independently, but also to take meticulous care to avoid color mixing based on interfering of the colors with each other.

For example, a leuco dye that exhibits a yellow color and a color developer acting on this leuco dye cause a reversible reaction of producing of color (a yellow color) or decoloring (transparent) by heating. Here, if a photothermal converting agent that absorbs light in a specific wavelength (for example, infrared light) and converts the light into heat is added, the photothermal converting agent generates heat by the irradiation with infrared light by, for example, a semiconductor laser or the like, which causes the above-described reaction.

In such a reversible multicolor recording medium, three types of layers (coloring layers) including coloring compounds that exhibit a yellow color, a magenta color, and a cyan color, corresponding color developers/reducers, and photothermal converting agents having different absorption wavelengths from one another are stacked, thereby making full-color recording possible. However, in the reversible multicolor recording medium having such a configuration, heat generated in a certain layer may be transmitted to an adjacent layer, and may cause unexpected producing of color or decoloring.

To prevent unexpected producing of color or decoloring, there is a method of providing a heat-insulating layer between the coloring layers. However, in the reversible multicolor recording medium in which three types of coloring layers are stacked as described above, if the heat-insulating layers are combined with the coloring layers, a total of at least five layers are stacked. Therefore, its manufacturing process becomes complicated and cumbersome. Furthermore, the heat-insulating layer is required to have more than a certain thickness to enhance their heat-insulating property. Therefore, the display performance may be possibly degraded.

Meanwhile, in the present embodiment, the fiber assembly 31 including the fiber 311 having a core-sheath structure, which includes the core part 312 and the sheath part 313, is formed as a reversible recording medium. The core part 312 contains the coloring compound, the photothermal conversion material, and the color developer/reducer. The sheath part 313 includes the heat-insulating material and covers the core part 312. Accordingly, when infrared light having any wavelength is applied to cause a color-producing reaction or a decoloring reaction, it is possible to prevent parts other than the infrared-light-irradiated part from causing the color-producing or decoloring reaction. Therefore, it is possible to record a delicate image, etc.

In particular, as described above, in the fiber assembly 31 including a plurality of types of fibers (for example, the fibers 311C, 311M, and 311Y) that exhibit different colors, heat conduction to fibers (the fibers 311M and 311Y) other than a fiber (for example, the fiber 311C) that exhibits an intended color is suppressed. Therefore, it is possible to prevent color mixing or decoloring due to unexpected producing of color. That is, it is possible to provide a reversible recording medium with high display performance.

Furthermore, in the present embodiment, as described above, by spinning the fibers 311C, 311M, and 311Y that are able to exhibit a yellow color, a magenta color, and a cyan color by using the wet spinning method or the electrospinning method, it becomes possible to form the fiber assembly 31 that allows for full-color recording in one step. That is, it becomes possible to simplify the manufacturing process.

By combining the above-described fiber assembly 31 with, for example, an electrophoresis device 30 described below, it becomes possible to provide an electrophoretic display that is able to perform full-color display.

2. Second Embodiment

FIG. 6 illustrates a cross-sectional configuration of a display unit (a display unit 2) according to a second embodiment of the present disclosure. This display unit 2 uses, for example, an electrophoresis device (the electrophoresis device 30) as a display device, and is an electrophoresis display that produces contrast by utilizing an electrophoresis phenomenon. FIG. 7 schematically illustrates a planar configuration of the electrophoresis device 30. As illustrated in FIGS. 6 and 7, the electrophoresis device 30 includes migrating particles 33 and a porous layer in the insulating liquid 32. The fiber assembly 31 described in the first embodiment is used in the porous layer. It is to be noted that FIG. 6 schematically illustrates the configuration of the display unit 2, and may differ from the actual dimensions and shapes.

[2-1. Configuration of Display Unit]

For example, as illustrated in FIG. 6, the display unit 2 includes a support substrate 10 and a counter substrate 20 that are disposed to face each other with the electrophoresis device 30 in between, and has a display surface on the counter substrate 20 side thereof. The wording "having a display surface on the counter substrate 20 side thereof" means that an image is displayed toward the counter substrate 20 side (a user is able to visually recognize an image from the counter substrate 20 side).

In the support substrate 10, a lower electrode 12 and a protective layer 13 are provided on one surface of the support base 11 in this order, for example. The lower electrode 12 is formed to be segmented and segmentally disposed in a matrix in accordance with a pixel pattern or the like, for example.

The support base 11 includes a material similar to that of the support base 11 in the above-described first embodiment. By using a flexible material in the support base 11, it becomes possible to achieve the flexible (bendable) display unit 2.

The lower electrode 12 includes, for example, a metallic material, such as gold (Au), silver (Ag), and copper (Cu). The protective layer 13 includes, for example, an insulating resin material, such as polyimide. Although it is not illustrated, for example, a planarization insulating layer that planarizes a surface may be provided on the protective layer 13.

It is to be noted that FIG. 6 illustrates a case where two lower electrodes 12 are disposed in each cell 36 to be described later; however, this is not necessarily limiting. Any number of cells 36 and any number of lower electrodes 12 may be provided the cells 36 and the lower electrodes 12 may have any positional relationship. For example, one lower electrode 12 may be disposed with respect to one cell 36, or two lower electrodes 12 may be disposed with respect to three cells 36. Furthermore, the lower electrode 12 may be provided on the entire surface (a surface facing the counter substrate 20) of the support base 11, as with a counter electrode 22.

The counter substrate 20 has, for example, the support base 21 and the counter electrode 22. The counter electrode 22 is provided on an entire surface (a surface facing the support substrate 10) of the support base 21. The counter electrodes 22 may be disposed in a matrix or in a segmental shape, as with the lower electrode 12. A sealing layer 23 that seals the electrophoresis device 30 is provided on the counter electrode 22, and the counter substrate 20 and the electrophoresis device 30 are stuck together by the sealing layer 23.

The support base 21 includes, for example, a material similar to that of the support base 21 in the above-described first embodiment. The counter electrode 22 includes, for example, a light-transmissive electrically-conducting material (a transparent electrode material), such as indium-tin oxide (ITO), antimony-tin oxide (ATO), fluorine-doped tin oxide (FTO), and aluminum-doped zinc oxide (AZO).

In a case where an image is displayed on the counter substrate 20 side, the display unit 2 (the electrophoresis device 30) is viewed through the counter electrode 22. Therefore, a light transmission property (transmittance) of the counter electrode 22 is preferably as high as possible, and is, for example, 80% or higher. Furthermore, electrical resistance of the counter electrode 22 is preferably as low as possible, and is, for example, 100 Ω/sq. or lower.

The sealing layer 23 includes, for example, an insulating resin material, such as polyimide, as with the protective layer 13. It is to be noted that an adhesion layer (not illustrated) may be additionally provided between the sealing layer 23 and the counter electrode 22. The strength of adhesion of the counter substrate 20 to the electrophoresis device 30 is ensured by the adhesion layer. Furthermore, a moisture-proof film or the like that prevents intrusion of moisture, etc. may be provided on a display surface side of the support base 21.

As described above, the electrophoresis device 30 includes the migrating particles 33 and the fiber assembly 31 in the insulating liquid 32. The migrating particles 33 are dispersed in the insulating liquid 32, and the fiber assembly 31 has the plurality of fine pores 314. One, or two or more partitions 35 are adjacent to the fiber assembly 31 from the opposite side of the display surface (the side of the support substrate 10). These are an example of components of the electrophoresis device 30.

For example, a space between the support substrate 10 and the counter substrate 20 is filled with the insulating liquid 32. The insulating liquid 32 includes, for example, any one type or two or more types of nonaqueous solvents such as organic solvents, specifically, hydrocarbon-based solvents such as paraffin and isoparaffin. The viscosity and the refractive index of the insulating liquid 32 are preferably as low as possible. If the viscosity of the insulating liquid 32 is lowered, the mobility (the response speed) of the migrating particles 33 is improved. Furthermore, in accordance with this, energy (power consumption) necessary for migration of the migrating particles 33 is lowered.

The insulating liquid 32 may contain various other materials as necessary. For example, a colorant, a charge modifier, a dispersion stabilizer, a viscosity modifier, a surfactant, resin, etc. may be added.

The migrating particles 33 are one, or two or more charged particles (electrophoretic particles) that electrically migrate. The migrating particles 33 migrate in the insulating liquid 32 toward the lower electrode 12 or the counter electrode 22 in accordance with an electric field, thereby switching the image displayed on the display surface, for example, by concealing an image, etc. recorded on the fiber assembly 31. The migrating particle 33 includes, for example, particles (powder) of an organic pigment, an inorganic pigment, a pigment, a carbon material, a metallic material, metallic oxide, glass, a polymeric material (resin), etc. One type, or two or more types of these may be used as the migrating particle 33. The migrating particle 33 may be a pulverized particle of solid resin containing the foregoing particle, a capsule particle containing the foregoing particle, etc. It is to be noted that a material corresponding to the carbon material, the metallic material, the metallic oxide, the glass, or the polymeric material described above is excluded from a material corresponding to the organic pigment, the inorganic pigment, or the pigment described above. A particle size of the migrating particle 33 is, for example, 30 nm to 300 nm.

The above-described organic pigment is, for example, an azo-based pigment, a metal-complex azo-based pigment, a poly-condensation azo-based pigment, a flavanthrone-based pigment, a benzimidazolone-based pigment, a phthalocyanine-based pigment, a quinacridone-based pigment, an anthraquinone-based pigment, a perylene-based pigment, a perinone-based pigment, an anthrapyridine-based pigment, a pyranthrone-based pigment, a dioxazine-based pigment, a thioindigo-based pigment, an isoindolinone-based pigment, a quinophthalone-based pigment, an indanthrene-based pigment, etc. The inorganic pigment is, for example, zinc white, antimony white, iron black, titanium boride, colcothar, Mapico yellow, red lead, cadmium yellow, zinc sulfide, lithopone, barium sulfide, cadmium selenide, calcium carbonate, barium sulfate, lead chromate, lead sulfate, barium carbonate, white lead, alumina white, etc. The pigment is, for example, a nigrosine-based pigment, an azo-based pigment, a phthalocyanine-based pigment, a quinophthalone-based pigment, an anthraquinone-based pigment, a methine-based pigment, etc. The carbon material is, for example, carbon black, etc. The metallic material is, for example, gold, silver, copper, etc. The metallic oxide is, for example, titanium oxide, zinc oxide, zirconium oxide, barium titanate, potassium titanate, copper-chromium oxide, copper-manganese oxide, copper-iron-manganese oxide, copper-chromium-manganese oxide, copper-iron-chromium oxide, etc.

The polymeric material is, for example, a polymer compound with a functional group having a light absorption region in a visible light region introduced thereto, etc. A type of the polymer compound is not particularly limited, as long as it has a light absorption region in a visible light region. A series of such materials may be a single material, or may be a mixture of two or more types of materials.

The content (concentration) of the migrating particles 33 in the insulating liquid 32 is, for example, 0.1% by weight to 10% by weight, though it is not particularly limited thereto. The screening performance of the fiber assembly 31 with respect to the migrating particles 33 and the mobility of the migrating particles 33 through the fiber assembly 31 are ensured in this concentration range. Specifically, if the content of the migrating particles 33 is less than 0.1% by weight, the migrating particles 33 are unlikely to conceal the fiber assembly 31, and may fail to produce contrast sufficiently. On the other hand, if the content of the migrating particles 33 is more than 10% by weight, the dispersibility of the migrating particles 33 decreases, and therefore, the migrating particles 33 become less migratable, and may be agglutinated.

The migrating particles 33 have any optical reflection property (optical reflectance). Although it is not particularly limited, the optical reflectance of the migrating particles 33 is preferably set so that at least that the migrating particles 33 are able to conceal the fiber assembly 31.

Here, a specific material of the migrating particles 33 is selected, for example, in accordance with a role played by the migrating particles 33. In a case where the migrating particles 33 take on, for example, white display, for example, metallic oxide, such as titanium oxide, zinc oxide, zirconium oxide, barium titanate, and potassium titanate, is used. Of these, titanium oxide is preferable because it is excellent in electrochemical stability and dispersibility and leads to high reflectance.

It is to be noted that a color of the migrating particles 33 visually recognized from the outside is not particularly limited, as long as it is able to produce contrast.

It is preferable that the migrating particles 33 be easily dispersed and charged in the insulating liquid 32 over a long period of time and not easily adsorbed to the fiber assembly 31. Therefore, a dispersing agent (a charge modifier) for dispersing the migrating particles 33 by means of electrostatic repulsion may be used, or surface treatment may be performed on the migrating particles 33, or both may be used in combination.

This dispersing agent or charge modifier has, for example, either one or both of positive and negative charges, and increases the amount of electric charge in the insulating liquid 32. Examples of such dispersing agents include the Solsperse series available from Lubrizol Corporation, the BYK series or the Anti-Terra series available from BYK-Chemie GmbH, the Span series available from TCI America Inc, etc.

The surface treatment is, for example, rosin treatment, surfactant treatment, pigment derivative treatment, coupling agent treatment, graft polymerization treatment, microencapsulation treatment, etc. By performing particularly graft polymerization treatment, microencapsulation treatment, or a combination of these, it becomes possible to maintain the long-term dispersion stability of the migrating particles 33.

In such surface treatment, for example, a material (an adsorbing material) having a functional group (an adsorbing functional group), which is able to adsorb surfaces of the migrating particles 33, and a polymerizable functional group is used. The adsorbing functional group is decided in accordance with a formation material of the migrating particles 33. For example, the adsorbing functional group is able to adsorb an aniline derivative, such as 4-vinylaniline, in a case where the migrating particles 33 include a carbon material, such as carbon black, and an organosilane derivative, such as methacrylic acid 3-(trimethoxysilyl)propyl, in a case where the migrating particles 33 include metallic oxide. The polymerizable functional group is, for example, a vinyl group, an acrylic group, a methacrylic group, etc.

The surface treatment may be performed by introducing a polymerizable functional group into the surfaces of the migrating particles 33 to perform grafting (a grafting material). The grafting material has, for example, a polymerizable functional group and a functional group for dispersion. The functional group for dispersion causes the migrating particles 33 to be dispersed in the insulating liquid 32, and keeps the dispersibility by its steric hindrance. For example, in a case where the insulating liquid 32 is paraffin, a branched alkyl group or the like is able to be used as the functional group for dispersion. The polymerizable functional group is, for example, a vinyl group, an acrylic group, a methacrylic group, etc. To polymerize and graft the grafting material, for example, a polymerization initiator, such as azobisisobutyronitrile (AIBN), may be used. Besides this, a material having a functional group that is able to adsorb the surfaces of the migrating particles 33 and an alkyl chain for giving dispersibility is able to be used. Examples of such a material include a titanate-based coupling agent (for example, KR-TTS available from Ajinomoto Fine-Techno Co., Inc.) and an aluminate-based coupling agent.

For details of a method of dispersing the migrating particles 33 in the insulating liquid 32, refer to a book "Ultrafine Particle Dispersion Technique and its Evaluation—Surface Treatment/Fine Grinding and Stabilization of Dispersion in Air, Liquid, Macromolecule—(Science&Technology Co., Ltd.)", etc.

As illustrated in FIG. 6, the fiber assembly 31 is a three-dimensional structure (an irregular network structure like non-woven fabric) provided by, for example, the three types of fibers 311C, 311M, and 311Y, and has one, or two or more voids (the fine pores 314). The fine pores 314 are filled with the insulating liquid 32, and the migrating particles 33 migrate between the lower electrode 12 and the counter electrode 22 through the fine pores 314. It is to be noted that the fiber assembly 31 may be adjacent to the counter electrode 22, or may be separated from the counter electrode 22. Furthermore, the fiber assembly 31 may be supported by the spacer 40 that supports the space between the support substrate 10 and the counter substrate 20.

Although it is not particularly limited, a Z-axis direction thickness (hereinafter, referred to simply as thickness) of the fiber assembly 31 in the present embodiment is, for example, from 5 μm to 100 μm. A reason for this is that the screening performance of the fiber assembly 31 is increased, and it becomes easier for the migrating particles 33 to migrate through the fine pores 314.

The fiber assembly 31 may include one, or two or more non-migrating particles (not illustrated). The non-migrating particles are one, or two or more particles that do not electrically migrate. The non-migrating particles may be contained in, for example, the core part 312 and the sheath part 313 of the fiber 311 having the core-sheath structure. The non-migrating particles preferably have an optical reflection characteristic different from that of the migrating particles 33. For example, in a case where the fiber assembly 31 is formed by using white particles (white pigment) as the non-migrating particles, it is possible to improve the color vividness (the saturation) in observation. In this case, a higher effect is obtained by containing the non-migrating particles in the core part 312. Furthermore, by using a color pigment as the non-migrating particles, it becomes possible to cause intentional color mixing with a color that the coloring compound exhibits. For example, by adding blue non-migrating particles to the fiber assembly 31 containing a coloring compound that exhibits a red color, it becomes possible to form the fiber assembly 31 that appears in a blue color when the coloring compound decolors and in a black color when the coloring compound produces a color. In this case, the non-migrating particles may be contained in whichever of the core part 312 and the sheath part 313.

The partition 35 separates off an existable range of the migrating particles 33 dispersed in the insulating liquid 32, and, for example, as illustrated in FIG. 1, forms a space (the cell 36 to be described later) in which the migrating particles 33 are housed. The partition 35 extends, for example, toward the counter substrate 20, and is adjacent to part of the fiber assembly 31 from the opposite side of the display surface.

The number and array pattern of the cells 36 formed by the partitions 35 are not particularly limited. However, to dispose the plurality of cells 36 efficiency, the cells 36 are preferably arrayed in a matrix (an arrangement with rows and columns). Furthermore, a shape (an opening shape) of the cell 36 is not particularly limited, and may be a rectangular shape or other shapes (such as a hexagonal shape).

A formation material of the partition 35 is not particularly limited, as long as it does not affect the operation performance, etc. of the electrophoresis device 30; however, it is preferably resin or the like that is good for a molding process. A reason for this is that it is easy to form the partition 35 having an intended size and an intended shape. The resin is, for example, thermoplastic resin or light curable resin (including resist for photolithography), or may be resin other than these.

It is to be noted that, in a case of using resin as the formation material of the partition 35, the partition 35 is formed by, for example, a thermal imprint method using thermoplastic resin, a light imprint method using light curable resin, etc. Specifically, in the thermal imprint method, for example, a mold (a female die) is pressed against resin (a polymeric material) heated to a glass transition temperature or higher, and the mold is thereafter peeled from the cooled resin. As a result, a shape of the mold is imprinted on a surface of the resin, and the partition 35 having an intended shape is thereby formed. This mold may be, for example, a photoresist film molded by a photolithographic method, a metal plate molded by a machining process with a tool bit or the like, etc.

The partition 35 may have a support 37 that is continuous therewith on the support substrate 10 side thereof. The partition 35 may be supported by the support 37. In this case, the partition and the support 37 may be unitized (a partition unit 38). However, the partition 35 and the support 37 may be integrated together, or may be separated from each other. In the latter case, the support 37 may be a film or the like.

A width W of the partition 35 may be uniform in its extending direction, or may be non-uniform. For example, it is preferable that the width W gradually becomes smaller toward the fiber assembly 31. A reason for this is that an opening span (R3) of the cell 36 becomes wider toward the side of the display surface, and with this, a non-migratable region (R4) of the migrating particles 33 becomes smaller, thus causing an image display range to become larger. Although it is not particularly limited, an inclination angle (a so-called taper angle) of a side surface of the partition 35 is, for example, 60° to 90°, preferably 75° to 85°.

It is to be noted that a pitch, a height, etc. of the partitions 35 are not particularly limited, and are able to be set to any value. For example, the pitch of the partitions 35 is from 30 μm to 300 μm, preferably from 60 μm to 150 μm, and the height of the partition 35 is from 10 μm to 100 μm, preferably from 30 μm to 50 μm.

Furthermore, it is preferable that the height of the partition 35 and the thickness of the fiber assembly 31 in the Z-axis direction be nearly uniform. A reason for this is that a distance (a so-called gap) between the lower electrode 12 and the counter electrode 22 becomes constant, thus the field intensity is uniformized. This improves unevenness of response speed, etc.

As with the first embodiment, the spacer 40 is for supporting the space between the support substrate 10 and the counter substrate 20, and has a similar configuration. A thickness of the spacer 40 (a distance from the support substrate 10 to the counter substrate 20) is, for example, from 10 μm to 100 μm, and is preferably as thin as possible. This makes it possible to suppress power consumption. The spacer 40 includes, for example, an insulating material, such as a polymeric material. Although an arrangement shape of the spacer 40 is not particularly limited, the spacer 40 is preferably provided so as not to disturb the migration of the migrating particles 33 and so as to uniformly distribute the migrating particles 33. It is to be noted that the partition 35 may also serve as the spacer 40.

The display unit in the present embodiment that includes the electrophoresis device 30 including the fiber assembly 31 described in the above first embodiment may be provided with a thin film transistor (TFT) 14 between the support substrate 10 and the lower electrode 12 as illustrated in FIG. 8 (a display unit 3). As with the lower electrode 12, the TFT 14 is formed to be segmented and segmentally disposed in a matrix or in a segmental shape in accordance with a pixel pattern or the like, for example. The TFT 14 is a switching element for selecting a pixel. This TFT 14 may be an inorganic TFT using an inorganic semiconductor layer as a channel layer, or may be an organic TFT using an organic semiconductor layer. For example, a protective layer 15 and a planarization insulating layer 16 are stacked on the TFT 14 in this order, and the lower electrode 12 is provided on the planarization insulating layer 16. The protective layer 15 and the planarization insulating layer 16 include, for example, an insulating resin material, such as polyimide. If a surface of the protective layer 15 is sufficiently flat, it is possible to omit the planarization insulating layer 16. The lower electrode 12 is coupled to the TFT 14 through a contact hole (not illustrated) provided on the protective layer 15 and the planarization insulating layer 16.

In the display unit 3, the support substrate 10 is provided with a peripheral circuit (not illustrated) for driving the electrophoresis device 30 on a pixel-to-pixel basis (applying a drive voltage between the lower electrode 12 and the counter electrode 22). The peripheral circuit includes, for example, a driver for voltage control for forming an active matrix drive circuit, a power source, a memory, etc., and is able to apply a drive voltage corresponding to an image signal to one, or two or more selective subpixels.

[2-2. Manufacturing Method of Display Unit]

The display unit 2 is able to be manufactured by, for example, the following method. It is to be noted that the manufacturing method described here is an example, and the display unit 2 may be manufactured by using another method.

First, the support substrate 10 is fabricated by forming the lower electrode 12 and the protective layer 13 on one surface of the support base 11 in this order, and the partition unit 38 is formed. It is to be noted that, as a method of forming each component, for example, an existing forming method is able to be selected and used whenever it is necessary. Furthermore, the partition 35 and the support 37 of the partition unit 38 may be formed to be integrated together by molding resin using the thermal imprint method, etc. as described above, or may be formed to be separated from each other. It is to be noted that an adhesive layer, etc. may be formed on an as-needed basis between the protective layer 13 and the partition unit 38.

Thereafter, the migrating particles 33 and the fiber assembly 31 formed by using the method described in the above first embodiment are housed in the cells 36 formed by the partition unit 38, and the insulating liquid 32 is injected into the cells 36. In this fiber assembly 31, an area occupancy rate of the fine pores 314 is nearly uniform over an entire area of the fiber assembly 31. Next, the support substrate 10 and the counter substrate 20 including the counter electrode 22 are disposed to face each other, and the support substrate 10 and the counter substrate 20 are stuck together. At this time, by providing the sealing layer 23 on the counter electrode 22, the cells 36 are sealed by the counter substrate 20. Thus, the display unit 2 illustrated in FIG. 6 is completed.

[2-3. Operation of Display Unit]

The display unit 2 in the present embodiment is able to switch an image displayed on the display surface by operating as follows. FIGS. 9A and 9B are for describing a basic operation of display unit 2, and illustrate a cross-sectional configuration corresponding to FIG. 6. It is to be noted that, here, for sake of simplicity of contents of the illustration, the fiber assembly 31 is illustrated in a plate-like form, and the sealing layer 23 and the partition unit 38 are omitted.

First, an image is formed on the fiber assembly 31 by using the method described in the first embodiment in advance. In the display unit 2 in an initial state, the migrating particles 33 are disposed in a retreat region R1 (FIG. 9A). In this case, the migrating particles 33 in all pixels are screened by the fiber assembly 31. Therefore, when viewed from the side of the counter substrate 20, the display unit 2 is in a state where the image formed on the fiber assembly 31 is displayed on its display surface.

Meanwhile, when an electric field is applied between the lower electrode 12 and the counter electrode 22, the migrating particles 33 migrate from the retreat region R1 to a display region R2 through the fiber assembly 31 (the fine pores 314) on a pixel-to-pixel basis as illustrated in FIG. 9B. In this case, the fiber assembly 31 is concealed by the migrating particles 33. For example, in a case where the migrating particles 33 are white, the display unit 2 is in a white display state when viewed from the side of the counter substrate 20.

In a case where the TFT 14 is provided for each pixel as in the case of the display unit 2 illustrated in FIG. 8, by appropriately performing selecting of the respective TFTs 14, it becomes possible to control the migrating particles 33 migrating from the retreat region R1 to the display region R2 on a pixel-to-pixel basis. Accordingly, it is possible to conceal the image formed on the fiber assembly 31 on a pixel-to-pixel basis.

[2-4. Workings and Effects]

In general, a producing-of-color/decoloring reaction derived from a reaction between a coloring compound and a color developer/reducer requires large-scale equipment, such as a laser irradiator, a heater, etc. On the other hand, the display unit 2 (and the display unit 2) in the present embodiment is able to switch an image formed on the fiber assembly 31 at any time and place by a combination of the fiber assembly 31 and the electrophoresis device 30, without using large-scale equipment.

3. Application Examples

Subsequently, there are described examples of application of the reversible recording medium 1 and the display units 2 and 3 that include the fiber assembly 31 described in the above first and second embodiments. However, a configuration of an electronic apparatus described below is merely an example, and the configuration is able to be modified where appropriate. The reversible recording medium 1 and the display units 2 and 3 described above are applicable, as parts of various electronic apparatuses or accessories, for example, as a part of a wearable terminal, to, for example, parts of accessories, such as watches (wristwatches), bags, clothes, hats, eyeglasses, and shoes. Types of such electronic apparatuses, etc. are not particularly limited.

Application Example 1

FIGS. 10A and 10B illustrate an exterior of an electronic watch (an electronic apparatus integral with a wristwatch). This electronic watch has, for example, a dial (a character information display part) 110 and a band part (a colored pattern display part) 120, and the dial 110 and the band part 120 include the reversible recording medium 1 or the display unit 2 (or the display unit 3). For example, various characters and drawing patterns are displayed on the dial 110 by display driving using the above-described electrophoresis device as illustrated in FIGS. 10A and 10B. The band part 120 is a part that is able to be worn, for example, around one's arm, etc. The display unit 2 is used in this band part 120, which makes it possible to display various colored patterns, and, as in examples of FIGS. 10A and 10B, change a design of the band part 120. It is possible to achieve a useful electronic device for fashion purposes as well.

Application Example 2

FIGS. 11A and 11B illustrate an exterior of a bag. This bag has, for example, a containing part 210 and a handle part 220, and the reversible recording medium 1 or the display unit 2 (or the display unit 3) is attached to, for example, the containing part 210. Various characters and drawing patterns are displayed on the containing part 210 by the reversible recording medium 1 or the display unit 2 (or the display unit 3). Furthermore, by attaching the reversible recording medium 1 or the display unit 2 (or the display unit 3) to the handle part 220, it becomes possible to display various colored patterns, and, as in examples of FIGS. 11A and 11B, change a design of the containing part 210. It is possible to achieve a useful electronic device for fashion purposes as well.

Application Example 3

FIGS. 12A and 12B illustrate an exterior configuration of an electronic book. This electronic book includes, for example, a display part 310, a non-display part 320, and an operation unit 330. It is to be noted that the operation unit 330 may be provided on a front face of the non-display part 320 as illustrated in FIG. 12A, or may be provided on a top face as illustrated in FIG. 12B. The display part 310 includes the display unit 3 (or the display unit 3). It is to be noted that the reversible recording medium 1 or the display unit 2 (and the display unit 3) may be equipped in a personal digital assistants (PDA), etc. having a configuration similar to that of the electronic book illustrated in FIGS. 12A and 12B.

Application Example 4

FIG. 13 illustrates an exterior of a tablet personal computer. This tablet personal computer has, for example, a touch panel part 410 and a housing 420, and the touch panel part 410 includes the reversible recording medium 1 or the above-described display unit 2 (or the display unit 3).

4. Working Examples

Subsequently, working examples of the present disclosure are described in detail.

Experiment 1: Evaluation of Fiber Assembly

Experimental Example 1-1

First, 10 g of poly-(vinyl chloride-co-vinyl acetate) is dissolved in 100 g of tetrahydrofuran (THF). Thereafter, 8 g of a color developer was added and dispersed in this THF solution by using a bead mill in which beads of 0.3 mm in diameter (φ) were put. Then, 1 g of a leuco dye that exhibits a cyan color (C) and 0.1 g of a photothermal conversion agent were further added to prepare a solution A (a solution for core part). Next, 90 g of pure water was put in a flask, and 10 g of polyvinyl alcohol was gradually added in the flask while performing stirring at 300 rpm. After all contents were put, the temperature was increased up to 100° C. while continuing the stirring, and then it was kept for one hour to prepare a solution B (a sheath part solution). Thereafter, the solution A and the solution B were put into a syringe for core part and a syringe for sheath part, respectively, and a voltage of 40 kV was applied by using an Electrospinner NF-500 available from MECC CO., LTD. The solutions formed into fibers in a spinning environment kept at 60° C. Thus, non-woven fabric (sample 1) was fabricated.

Experimental Example 1-2

Here, 10 g of poly-(vinyl chloride-co-vinyl acetate) is dissolved in 100 g of methyl ethyl ketone (MEK). Thereafter, 8 g of a color developer was added and dispersed in this MEK solution by using an ultrasonic disperser for 150 minutes. Further, 1 g of a leuco dye that is to exhibit the cyan color (C) and 0.1 g of a photothermal conversion agent were added to prepare a solution C. Next, the solution C was applied onto a PET film, and thereafter, the PET film was dried by means of a hot plate at 60° C. for 10 minutes to fabricate a cyan layer. Next, as with Experimental example 1-1, 90 g of pure water was put in a flask, and 3 g of polyvinyl alcohol was gradually added in the flask while performing stirring at 300 rpm. After all contents were put, the temperature was increased up to 100° C. while continuing the stirring, and then it was kept for one hour to prepare a solution B. Thereafter, the solution B was applied onto the dried cyan layer with the leuco dye contained therein. This was dried by means of a hot plate at 70° C. for 10 minutes to provide a heat insulating layer. A laminated film (sample 2) with a stack of the cyan layer and the heat insulating layer was thus fabricated.

Experimental Example 1-3

The solution A prepared by adding 1 g of the leuco dye that is to exhibit the cyan color (C) and 0.1 g of the photothermal conversion agent in Experimental example 1-1 was referred to as a solution A1. Further, using a method similar to that in Experimental example 1-1, solutions A2 and A3 containing a leuco dye that is to exhibit a magenta color (M) and a leuco dye that is to exhibit a yellow color (Y) instead of the leuco dye of the cyan color (C), respectively, were prepared. Thereafter, preparation and spinning of the solution B were performed using a method similar to that in Experimental example 1-1 to fabricate non-woven fabric (sample 3) including three types of fibers that each exhibit one of the cyan color (C), the magenta color (M), and the yellow color (Y) was fabricated.

Experimental Example 1-4

The solution A prepared by adding 1 g of the leuco dye that is to exhibit the cyan color (C) and 0.1 g of the photothermal conversion agent in Experimental example 1-2 was referred to as the solution A1. Further, using a method similar to that in Experimental example 1-1, the solutions A2 and A3 containing the leuco dye that is to exhibit the magenta color (M) and the leuco dye that is to exhibit the yellow color (Y) instead of the leuco dye of the cyan color (C), respectively, were prepared. Thereafter, preparation of the solution B was performed using a method similar to that in Experimental example 1-1, and thereafter, a procedure similar to that in Experimental example 1-2 was performed to fabricate a laminated film (sample 4) in which a magenta layer, a heat insulating layer, a cyan layer, a heat insulating layer, and a yellow layer were laminated in this order.

Above samples 1 to 4 were irradiated with lasers of wavelengths of 799 nm, 854 nm, and 915 nm at a power of 400 mW on their photosensitive surfaces, and concentrations of the exhibited colors were evaluated. Table 1 illustrates results obtained from samples 1 to 4. Measurements were made by setting each sample on a white PET film (Lumirror E-20 available from Toray Industries, Inc.), and measuring CMYK concentrations of the sample by using x-rite eXact (available from X-Rite Inc.)

TABLE 1

|  | Cyan (C) | Magenta (M) | Yellow (Y) |
| --- | --- | --- | --- |
| Sample 1 | 1.5 | — | — |
| Sample 2 | 1.5 | — | — |
| Sample 3 | 1.5 | 1.4 | 1.1 |
| Sample 4 | 1.4 | 1.3 | 0.9 |

From Table 1, it was found that the concentration of only the cyan color (C) in the laminated film (sample 4) decreased from that of the single cyan layer (sample 2). On the other hand, in samples 1 and 3 fabricated as non-woven fabric, there was no difference in the concentration between the single-color spun one (sample 1) and the three-color simultaneous spun one (sample 3). That is, it was found that a more vivid color was displayed by forming it as non-woven fabric.

Experiment 2: Evaluation of Electrophoretic Display Unit

[Preparation of Electrophoretic Particles]

First, a mixed solution of 400 ml of tetrahydrofuran and 400 ml of methanol was prepared, and thereafter, 50 g of titanium dioxide (R-7E available from Sakai Chemical Industry Co., Ltd.) was added to the mixed solution. Ultrasonic stirring in an ultrasonic bath was performed on the mixed solution until end of a reaction. Thereafter, 40 ml of 28% ammonia water was gradually dropped in liquid with titanium dioxide microparticles dispersed therein, and thereafter, a solution in which 10 g of PLENACT KR-TTS (available from Ajinomoto Fine-Techno Co., Inc.) had been dissolved in 80 ml of tetrahydrofuran was further dropped in the liquid. Next, water temperature in the ultrasonic bath was increased up to 60° C., and after this temperature was kept for three hours, it was cooled down to room temperature. Centrifugal separation (at 6000 rpm for 10 minutes) and decantation were performed on the mixed solution as a cleaning operation. Thereafter, it was again dispersed in a mixed solvent of tetrahydrofuran and methanol (volume ratio 1:1), and a cleaning operation, including centrifugal separation (at 6000 rpm for 10 minutes) and decantation, was performed three times repeatedly. A precipitate obtained through the three-time cleaning operations was dried overnight by a vacuum oven at 70° C. Accordingly, white particles (electrophoretic particles) covered with a dispersion group were obtained.

[Preparation of Insulating Liquid]

Next, 16.7 g of OLOA 1200 (available from Chevron Chemicals) as a dispersing agent was dissolved in 83.3 g of insulating liquid to prepare a solution D. After 1 g of the above electrophoretic particles was added to 9 g of this solution D and ultrasonic dispersion was performed thereon, centrifugal separation (at 6000 rpm for 90 minutes) and decantation were performed, and the resultant was again dispersed in saturation insulating liquid. This operation was performed three times repeatedly, and a solution was prepared so as to obtain a cleaned electrophoretic particle component of 10% by weight, which was referred to as a solution E. Next, 1 g of OLOA 1200, 10 g of ADDOCONATE S (Lubrizol), and 20 g of the solution E were added to 69 g of the insulating liquid, and this mixture was stirred well. Accordingly, the insulating liquid containing the addition agents and the migrating particles was obtained.

[Assembly of Display Unit]

The fiber assembly obtained in working example 1-1 was formed on a glass substrate with a stock electrode formed thereon. Thereafter, a PET film (30 μm thick) as a spacer was put on a glass substrate with a counter electrode (ITO) formed on an entire surface thereof, and then the glass substrate with the pixel electrode and the fiber assembly formed thereon was put on top of this glass substrate. Lastly, the insulating liquid with the migrating particles dispersed therein was injected into a gap between the two glass substrates, and a display unit using the electrophoresis device as a display device was obtained.

An electric field of ±30 V was applied to the above display unit to cause the migrating particles to migrate and display properties were examined in a case where the migrating particles were disposed on the counter electrode side and a case where the migrating particles were disposed on the lower electrode side. As the migrating particles were negatively charged, in the case where the migrating particles were disposed on the counter electrode side, the display surface was white. In the case where the migrating particles were disposed on the lower electrode side, the display surface was cyan that was the color of the fiber assembly. That is, the fiber assembly was colored or decolored by the migrating particles.

Although the description of the present disclosure has been made by referring to the first and second embodiments and the working example as mentioned above, the present disclosure is not limited to the foregoing embodiments, etc. and may be modified in a variety of ways. For example, all the components described in the above first and second embodiments do not have to be provided, and other components may further be provided. Furthermore, the above-described material and thickness of each component are merely examples, and are not limited to those described above.

Moreover, in the above-described first embodiment, there is provided an example where the fiber assembly 31 is sealed between a pair of the support bases 11 and 21; however, for example, in a case of using the fiber assembly 31 fixed to the support base 11, the support base 21 may be omitted.

Furthermore, in the above-described second embodiment, there is provided an example where the electrophoresis device 30 is used as a display device; however, a reflective display device, such as a liquid crystal device, may be used. In such a case, the fiber assembly 31 is able to be used, for example, as a color filter.

It is to be noted that the effects described in this specification are mere examples and non-limiting, and there may be other effects.

It is to be noted that the present disclosure may have the following configurations.

(1)

A fiber assembly including a fiber,
the fiber including
a core part that contains a coloring compound, a photothermal conversion material, and a color developer/reducer, and
a sheath part that covers the core part and has a heat-insulating property.

(2)

The fiber assembly according to (2), in which the fiber provides a three-dimensional structure and has a void between the fiber.

(3)

The fiber assembly according to (2), in which
the three-dimensional structure includes a plurality of the fibers, and
the plurality of the fibers contain a plurality of the coloring compounds that exhibit colors different from each other.

(4)

The fiber assembly according to any one of (1) to (3), in which an average fiber diameter of the fiber is equal to or greater than 0.1 μm and equal to or smaller than 10 μm.

(5)

The fiber assembly according to any one of (1) to (4), in which the fiber is a nanofiber.

(6)

The fiber assembly according to any one of (1) to (5), in which the coloring compound is a leuco dye.

(7)

A display unit including:
a first substrate and a second substrate that are disposed to face each other; and
a display body disposed between the first substrate and the second substrate, the display body including a migrating particle and a fiber assembly in an insulating liquid, the fiber assembly being different in optical reflection property from the migrating particle, the fiber assembly including a fiber, the fiber including a core part that contains a coloring compound, a photothermal conversion material, and a color developer/reducer, and a sheath part that covers the core part and has a heat-insulating property.

(8)

The display unit according to (7), in which the migrating particle includes at least one of an organic pigment, an inorganic pigment, a dye, a carbon material, a metallic material, metallic oxide, glass, and a polymeric material.

(9)

An electronic apparatus including a display unit, the display unit including a first substrate and a second substrate that are disposed to face each other, and a display body disposed between the first substrate and the second substrate, the display body including a migrating particle and a fiber assembly in an insulating liquid, the fiber assembly being different in optical reflection property from the migrating particle, the fiber assembly including a fiber, the fiber including a core part that contains a coloring compound, a photothermal conversion material, and a color developer/reducer, and a sheath part that covers the core part and has a heat-insulating property.

This application claims the benefit of Japanese Priority Patent Application No. 2016-089057 filed with the Japan Patent Office on Apr. 27, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display unit comprising:

a first substrate and a second substrate that are disposed to face each other; and a display body disposed between the first substrate and the second substrate, the display body including a migrating particle and a fiber assembly in an insulating liquid, the fiber assembly being different in optical reflection property from the migrating particle, the fiber assembly including a fiber, the fiber including a core part that contains a coloring compound, a photothermal conversion material, and a color developer/reducer, and a sheath part that covers the core part and has a heat-insulating property.

2. The display unit according to claim 1, wherein the migrating particle includes at least one of an organic pigment, an inorganic pigment, a dye, a carbon material, a metallic material, metallic oxide, glass, and a polymeric material.

3. An electronic apparatus comprising a display unit, the display unit including a first substrate and a second substrate that are disposed to face each other, and a display body disposed between the first substrate and the second substrate, the display body including a migrating particle and a fiber assembly in an insulating liquid, the fiber assembly being different in optical reflection property from the migrating particle, the fiber assembly including a fiber, the fiber including a core part that contains a coloring compound, a photothermal conversion material, and a color developer/reducer, and a sheath part that covers the core part and has a heat-insulating property.

* * * * *